United States Patent
Choi et al.

(10) Patent No.: US 9,811,379 B2
(45) Date of Patent: Nov. 7, 2017

(54) HIGHLY EFFICIENT INEXACT COMPUTING STORAGE DEVICE

(71) Applicant: Samsung Electronics Co., Ltd., Suwon-si, Gyeonggi-do (KR)

(72) Inventors: Inseok Stephen Choi, Redwood City, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 134 days.

(21) Appl. No.: 14/838,351

(22) Filed: Aug. 27, 2015

(65) Prior Publication Data

US 2016/0350074 A1  Dec. 1, 2016

Related U.S. Application Data

(60) Provisional application No. 62/169,550, filed on Jun. 1, 2015.

(51) Int. Cl.
   *G06F 9/50* (2006.01)
   *G06F 9/44* (2006.01)

(52) U.S. Cl.
   CPC . *G06F 9/50* (2013.01); *G06F 9/44* (2013.01)

(58) Field of Classification Search
   CPC ......... G06F 17/30519; G06F 9/44; G06F 9/50
   See application file for complete search history.

(56) References Cited

U.S. PATENT DOCUMENTS

| | | |
|---|---|---|
| 6,959,316 B2 | 10/2005 | Parviainen |
| 8,375,180 B2 | 2/2013 | Chiu et al. |
| 8,819,335 B1 | 8/2014 | Salessi et al. |
| 2003/0053717 A1* | 3/2003 | Akhan .................. G06T 3/4084 382/302 |
| 2007/0112723 A1* | 5/2007 | Alvarez .................... G06F 9/50 |
| 2012/0039539 A1* | 2/2012 | Boiman ................ G11B 27/28 382/195 |
| 2013/0263142 A1 | 10/2013 | Miyamae |
| 2014/0122546 A1 | 5/2014 | Liao et al. |

\* cited by examiner

*Primary Examiner* — Chuong D Ngo
(74) *Attorney, Agent, or Firm* — Renaissance IP Law Group LLP

(57) ABSTRACT

A device (105) can include storage device (110) to store data. The device (105) can also include an accuracy requirement detector (120). Given an iteration of an algorithm (130) and the results of previous iterations of the algorithm (130), accuracy requirement detector (120) can determine the accuracy required for the current iteration of the algorithm (130). The device (105) can also include an adaptive mechanism (125) that can schedule the iteration of the algorithm (130) on an available arithmetic logic unit (ALU) based on the accuracy required for the iteration of the algorithm (130).

17 Claims, 19 Drawing Sheets

815

| Lookup Table | | |
|---|---|---|
| Location | ALU ID | Accuracy |
| C1 _903_ | ALU1 _906_ | 32 _909_ |
| C1 _903_ | ALU2 _912_ | 32 _915_ |
| C1 _903_ | ALU3 _918_ | 64 _921_ |
| C1 _903_ | GPGPU1 _924_ | 64 _927_ |
| C2 _930_ | ALU4 _933_ | 32 _936_ |
| C2 _930_ | ALU5 _939_ | 64 _942_ |
| C2 _930_ | ALU6 _945_ | 128 _948_ |
| C2 _930_ | GPGPU2 _951_ | 128 _954_ |
| D1 _957_ | ALU7 _960_ | 64 (conf.) _963_ |
| ⋮ | ⋮ | ⋮ |

FIG. 9

HIGHLY EFFICIENT INEXACT COMPUTING STORAGE DEVICE

RELATED APPLICATION DATA

This application claims the benefit of U.S. Provisional Patent Application Ser. No. 62/169,550, filed Jun. 1, 2015, which is hereby incorporated by reference for all purposes.

FIELD

The inventive concept pertains to computing, and more particularly to using inexact computing to improve computing performance.

BACKGROUND

Distributed cluster computing frameworks are popular to cope with ever-increasing Big Data in the modern computing era. Hadoop and Spark, for example, are quickly growing, and many internet-service companies such as Google, Facebook, Amazon, and the like are considering these cluster computing platforms as their platforms of choice to solve their many Machine Learning problems.

In addition, new startups, such as Palantir, provide such platforms and analytical applications as services. The keys to succeed in this business are competitive response times in providing services with high energy efficiency, because energy costs for data centers are substantial. As such, eliminating wasteful processes in computing is crucial.

Modern Big Data machine learning algorithms heavily rely on fast iterative methods. Conceptually, fast iterative methods provide not only a simple and fast converging framework, but also appeal to a data-centric philosophy. "Data-centric" means (generally) that analyzing more data with dumber algorithms is better than analyzing less data with stronger algorithms. Such an approach is well aligned to Big-Data analytics. That is, with ever-increasing data, it is important to cope with such large scale data in a reasonable amount time by sacrificing some degree of accuracy. In this context, fast iterative methods have become popular.

Such fast iterative methods come with two commonalities. First, as the number of iterations of the algorithm increases, a solution matures. For example, Coordinate Descent (CD) repeats search steps with finer granularity in its delta values in directions and search steps. Second, parallel solvers are often useful. Because of random and divergent nature of fast iterative methods, there are many variants that adopt parallel search techniques to enhance convergence speed and prune sub-optimal or divergent cases. These common characteristics can result in huge performance losses and energy wasted because the hardware or system frameworks work towards the best accuracy not knowing the end-use requirements. For example, commonly 64-bit Arithmetic Logic Units (ALUs) and/or 128-bit ALUs are used throughout the entire application to find a solution even for some processes that only require 32-bit or lower bit ALUs. Software solutions, such as GNU Multiple Precision (GMP) Arithmetic library and the NYU Core Library, can improve the precision beyond 128 bits, limited only by available memory. But using greater precision than is needed by the iteration of the algorithm is wasteful of resources and slow to process.

A need remains for a way to improve the performance of fast, inexact solution methods.

BRIEF DESCRIPTION OF THE DRAWINGS

FIG. 9 shows details of the lookup table of FIG. 8.

DETAILED DESCRIPTION

Figure 1:
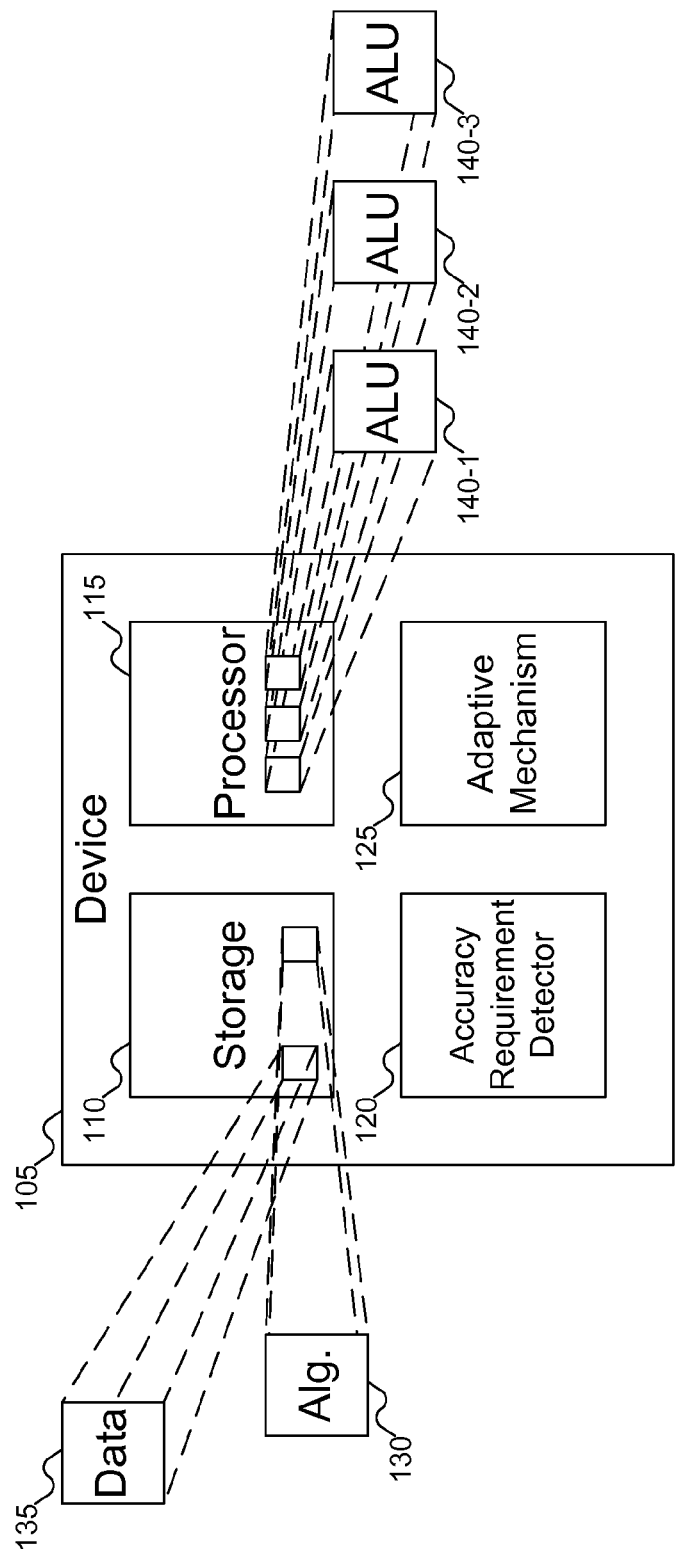
FIG. 1 shows a device enabling the use of variable accuracy computing to solve a fast, inexact algorithm, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Machine learning algorithms are widely used in Big Data analytics. In many cases, these algorithms involve the problem of minimizing an object function that has the form of a sum. The summand functions have a simple form that enables inexpensive evaluations of the sum-function and the sum gradient. Most of these "estimation" functions are very useful in modern computing platforms because such functions enable fast iterative methods; however they are inexact, rather than slow and exact. While being bounded by rigorous mathematical proof, fast iterative methods are critical to provide faster services, quicker business decisions, and better time-to-market.

Coordinate Descent (CD), for example, is a well-known non-derivative optimization method to find a local minimum of a function. While there are many variants of CD, one common observation is that the accuracy requirement for a solution increases as the iteration count increases. Unfortunately, modern computing execution frameworks are not aware of this tradeoff, and waste their computing power and increase their latency to achieve maximum resolutions. The early iterations of such an algorithm might not require the full capacity of the available hardware resources and/or software-supported precision, but later stage might require them. This can be understood from a software perspective, for example, using MapReduce.

It would be both faster and more energy efficient if a computing device can be made aware of the accuracy requirements per iteration, and adaptively change their computing accuracy or assign different Arithmetic Logic Units (ALUs) to the operation.

Accuracy-requirement aware inexact computing mechanisms can be used for machine learning frameworks. This mechanism can, for example, detect a delta (difference between iterations), then assign computation work to an ALU that is appropriate to the accuracy required by that iteration. Example destination ALUs can include Smart Solid State Devices (SSDs), which are capable of performing in-storage computing operations, host CPUs, networked CPUs, General-Purpose computing on Graphics Processing Units (GPGPUs), and configurable ALUs, among other possibilities.

An accuracy-requirement aware inexact computing mechanism can take the accuracy requirements as an input, and output an offloading ratio and/or job assignments to various ALUs. The output can be determined dynamically by considering the energy efficiencies of different/configurable ALUs. The maturity of the solution for the iteration can be dynamically determined by calculating delta values, iteration counts, and a user's specification, (e.g. a time limit along with an acceptable probability/error).

An accuracy-requirement aware inexact computing mechanism can include an accuracy-requirement detector, a scheduler and a mapper. The accuracy requirement detector can be a delta comparator detecting the difference between solutions of two adjacent steps or a first few evaluations. The output of the accuracy detector can be a required accuracy in terms of bits for integer operation and floating point operations. The mapper can determine the system configurations and accuracy requirements, generating mappings of operations and resources. Finally the scheduler can efficiently scheduling tasks to maximize energy efficiency with fast execution via proper device parallelism and near data processing.

In contrast with prior art computing models, in which all computation is executed on the host CPU using maximum accuracy available, embodiments of the inventive concept can enable using ALUs with lower accuracy (inexact computing). Embodiments of the inventive concept can achieve inexact computing by, among other possibilities, utilizing a reduced number of bits with configurable ALUs and/or less accurate ALUs, among all ALUs available (including in-storage computing, host ALUs, networked, ALUs, host GPGPUs, and networked GPGPUs, among other possibilities). By using ALUs with different accuracies for different iterations of the algorithm, embodiments of the inventive concept can optimize the performance of the system. In essence, embodiments of the inventive concept are self-configuring according to the needs of the algorithm.

Embodiments of the inventive concept can also enable fast-forwarding of search algorithms with early pruning. Such mechanisms accelerate the search rate or learning rate by utilizing energy efficient ALUs with faster latency (due to lower accuracy), on top of faster data transfer bandwidths available inside the storage units. As such, whole search algorithms can be accelerated. In addition, parallel path solving with pruning can be also be achieved, either utilizing multiple Storage Processing Units (SPUs) inside storage devices, or utilizing many cores inside GPGPUs.

Embodiments of the inventive concept can also include a scheduler comprised of configurable/heterogeneous ALUs awareness, an accuracy-requirement detector, and a mapper.

FIG. 1 shows a device enabling the use of variable accuracy computing to solve a fast, inexact algorithm, according to an embodiment of the inventive concept. In FIG. 1, device 105 is shown. The embodiment of the inventive concept shown in FIG. 1 describes device 105 as a smart SSD, but other embodiments of the inventive concept can include any device capable of supporting the described mechanism.

Device 105 can include storage 110, processor 115, accuracy requirement detector 120, and adaptive mechanism 125. Storage 110 can store information, such as algorithm 130 and data 135 (which can be used with algorithm 130). While FIG. 1 shows storage 110 as storing both algorithm 130 and data 135, embodiments of the inventive concept can separate where algorithm 130 and data 135 are stored. That is, algorithm 130 might be stored on a different device than data 135. Processor 115 can be any desired processor, and can include one or more ALUs, such as ALUs 140-1, 140-2, and 140-3. While FIG. 1 shows three ALUs 140-1, 140-2, and 140-3, FIG. 1 is merely an example, any processor 115 can include any number of ALUs.

Accuracy requirement detector 120 can be used to determine the accuracy required by an iteration of algorithm 130. Accuracy requirement detector 120 is described further with reference to FIG. 2 below. Adaptive mechanism 125 can use the result of accuracy requirement detector 120 and information about algorithm 130 to determine which ALU to use for an iteration of algorithm 130.

Figure 2:
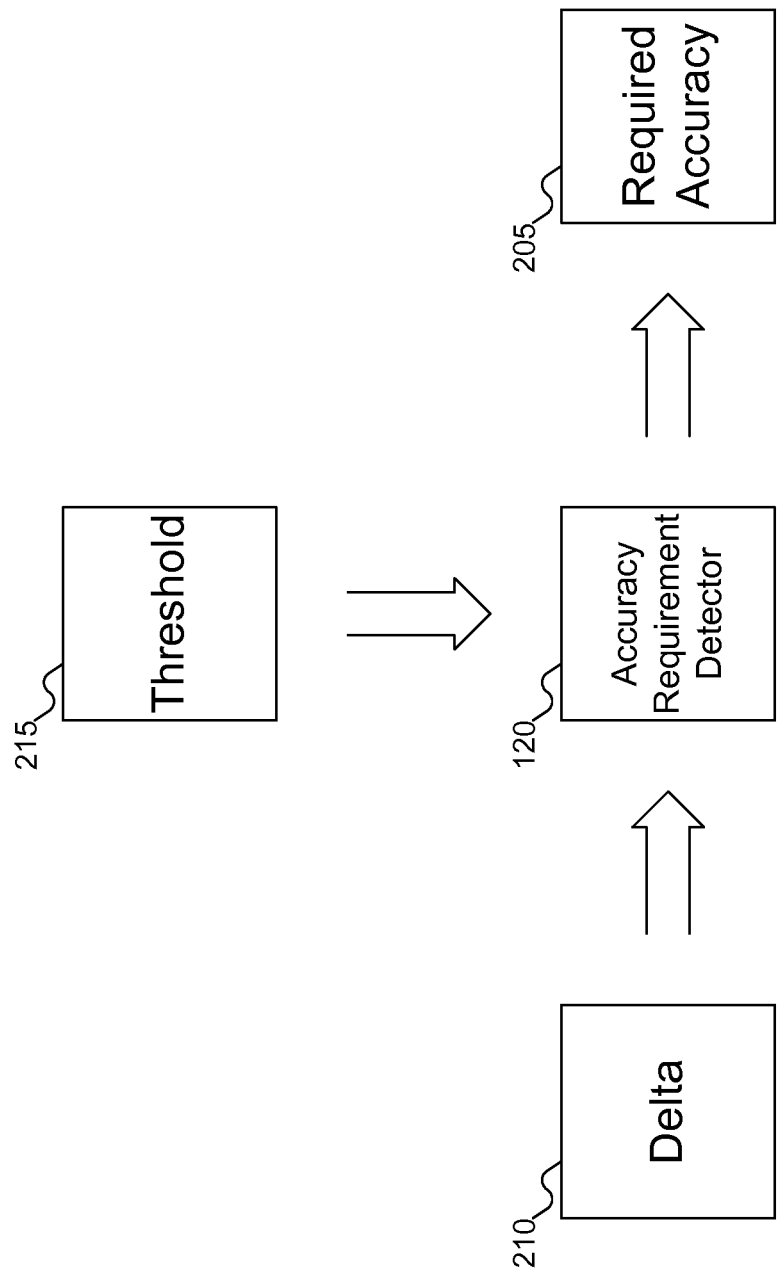
FIG. 2 shows the processor of FIG. 1 determining a required accuracy.
Figure 4:
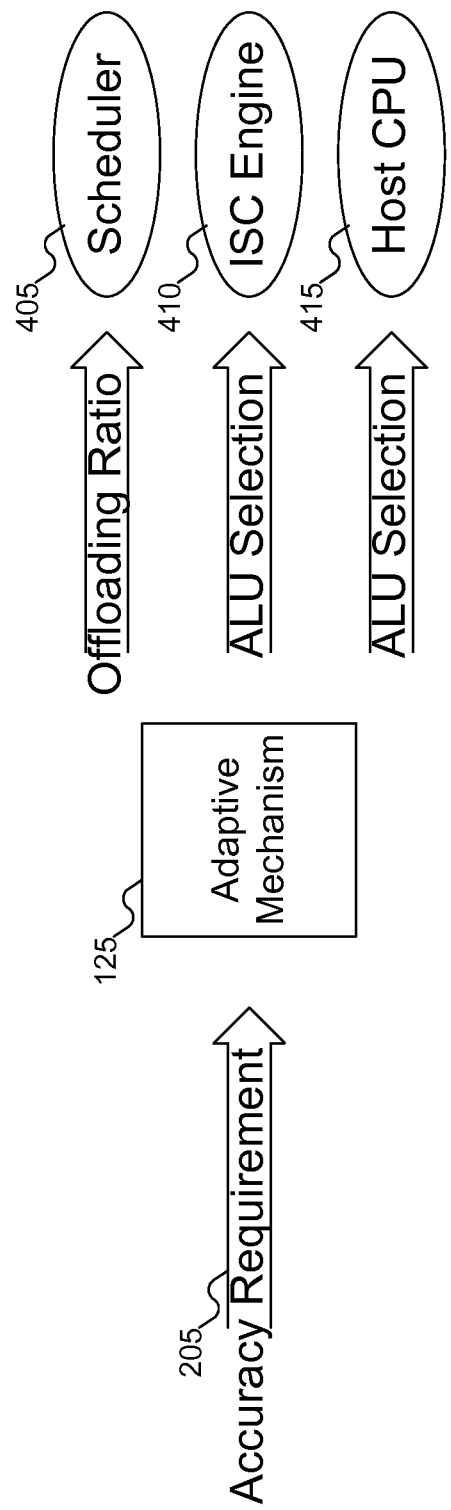
FIG. 4 shows the adaptive mechanism of FIG. 1 using the required accuracy of FIG. 2 to determine which Arithmetic Logic Unit(s) (ALU(s)) to use to solve a fast, inexact algorithm.

FIG. 2 shows accuracy requirement detector 120 of FIG. 1 the determining required accuracy 205 (more details of which are shown in FIG. 4 below). In FIG. 2, accuracy requirement detector 120 can receive delta 210 and threshold 215, and determined required accuracy 205. Delta 210 can be the difference in values as calculated between previous iterations of algorithm 130 of FIG. 1 (for example, between the immediately-preceding two iterations. Threshold 215 can be a threshold that can be used to determine whether to change the required accuracy. For example, the current accuracy required may be a 10-bit fractional part, and threshold 215 can be 0.005. If delta 210 is less than 0.005, then a 10-bit fractional part is insufficient accuracy, and accuracy requirement detector 120 can increase required accuracy 205: for example, to a 16-bit fractional part, or to a 23-bit fractional part. But if delta 210 is equal to or greater than 0.005, then a 10-bit fractional part remains sufficient and accuracy requirement 205 need not be changed.

While FIG. 2 shows only one threshold 215, embodiments of the inventive concept can include more than one threshold 215. Different thresholds can be used to trigger different levels of required accuracy 205. In this manner, embodiments of the inventive concept can use ALUs with varying levels of accuracy. For example, some ALUs can operate on 32-bit numbers, other ALUs can operate on 64-bit numbers, and still other ALUs can operate on 128-bit numbers. In addition, configurable ALUs (described further with reference to FIG. 11 below) can use varying levels of accuracy. Using multiple thresholds enables embodiments of the inventive concept to use these different ALUs more efficiently, as less accurate ALUs can be used when accuracy is less critical, and more accurate ALUs can be used when accuracy is more critical. Since there are often fewer ALUs that are more accurate, the demands on those ALUs are relatively greater. Utilizing less accurate ALUs reduces the amount of time an algorithm might have to wait for an available ALU. (This advantage is aside from the fact that less accurate ALUs can perform computations more quickly than more accurate ALUs, further reducing latency.)

Figure 3B:
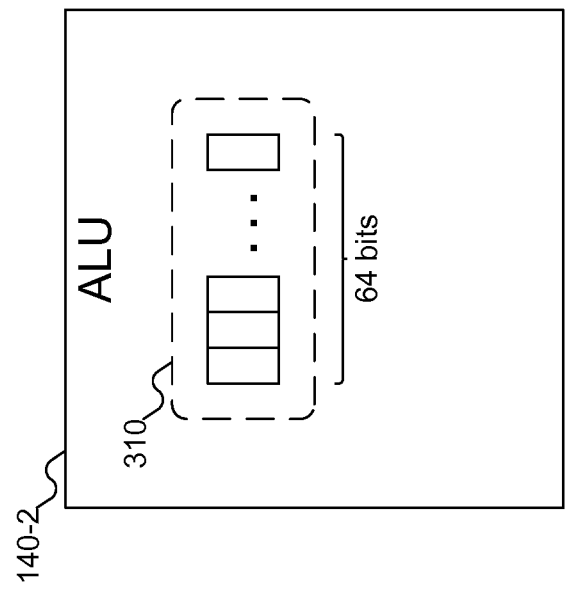
FIGS. 3A-3B show ALUs with different accuracies.
Figure 3A:
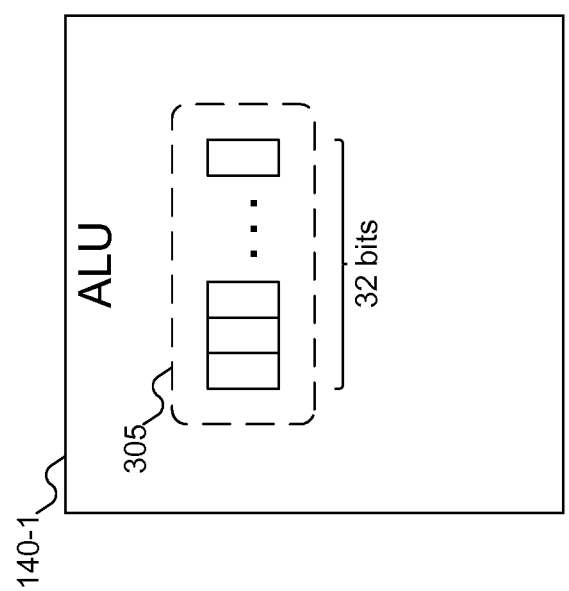

FIGS. 3A-3B show example ALUs with different accuracies. In FIG. 3A, ALU 140-1 is shown, with a 32-bit accuracy, as shown by number 305. In contrast, in FIG. 3B, ALU 140-2 is shown, with a 64-bit accuracy, as shown by number 310. Note that the ALUs themselves typically perform the same operations: the only difference for algorithmic scheduling purposes is the accuracy offered by the ALUs. ALU 140-2 of FIG. 3B is more accurate than ALU 140-1 of FIG. 3A, since ALU 140-2 uses more bits in computations.

Once accuracy requirement 205 has been determined, adaptive mechanism 125 of FIG. 1 can use accuracy requirement 205 to manage which ALUs perform iterations of algorithm 130 of FIG. 1. FIG. 4 shows adaptive mechanism 125 performing these operations in an example embodiment of the inventive concept. In FIG. 4, adaptive mechanism 125 receives accuracy requirement 205. Using accuracy requirement 205, along with information about what ALUs are available (described further with reference to FIGS. 8-9 below), adaptive mechanism 125 can inform scheduler 405 of an offloading ratio. Scheduler 405 can use the offloading ratio to allocate different operations to various ALUs. For example, scheduler 405 can schedule some iterations to ALUs in a Smart SSD (represented as in-storage computing engine 410 in FIG. 4), other iterations to a GPGPU on the host computer, and still other iterations to host CPU 415, among other possibilities.

Figure 5:
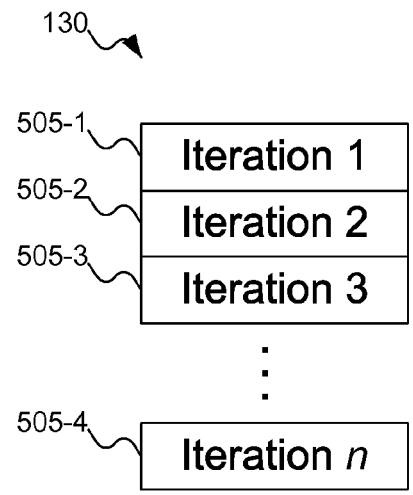
FIG. 5 shows a fast, inexact algorithm with a number of iterations.

As described above, embodiments of the inventive concept are applicable to iterative algorithms that eventually result in a solution. FIG. 5 shows a fast, inexact algorithm with a number of iterations. In FIG. 5, algorithm 130 is shown as including a number of iterations: iteration 1 (505-1), iteration 2 (505-2), iteration 3 (505-3), and so on. In general, one can refer to the n-th iteration of the algorithm, shown as iteration 505-4.

As discussed above, embodiments of the inventive concept can include algorithms with parallel path solving. For example, Coordinate Descent operates by attempting to minimize a function along all possible directions, then selecting the direction that produces the greatest minimization. This approach can be thought of as parallel path solving.

Figure 6:
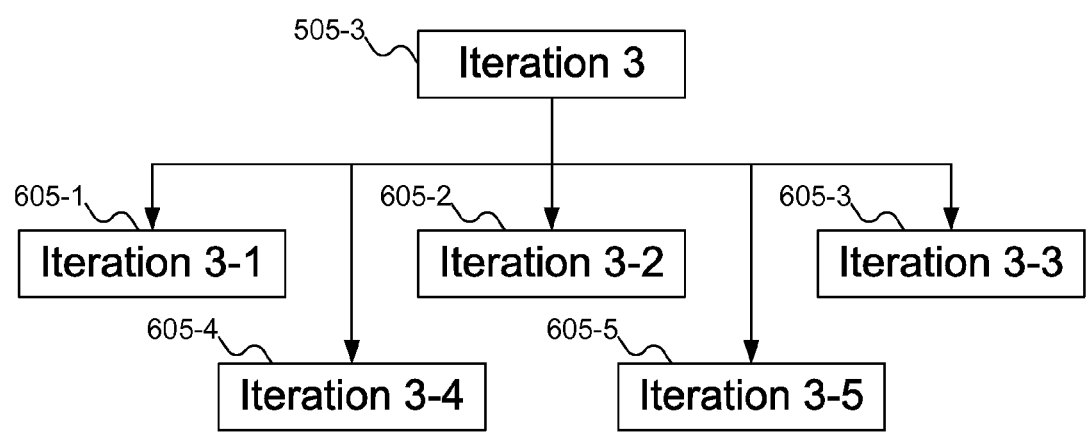
FIG. 6 shows an iteration of the fast, inexact algorithm of FIG. 5 with parallel solutions for an iteration.

FIG. 6 shows an iteration of the fast, inexact algorithm of FIG. 5 with parallel solutions for an iteration. In FIG. 6, iteration 3 (505-3) is shown as including five alternative calculations 605-1, 605-2, 605-3, 605-4, and 605-5, but any iteration could have any number of alternative calculations: the five alternative calculations shown in FIG. 6 are merely exemplary. Depending on the results of the alternative calculations, different improvements in the overall performance of algorithm 130 of FIG. 1 can be calculated from alternative calculations 605-1, 605-2, 605-3, 605-4, and 605-5. Embodiments of the inventive concept can assign different alternative calculations to different processors, and then use the result with the greatest improvement to select a particular path to use. The other paths, calculated using the other alternative calculations, can be discarded.

Figure 7:
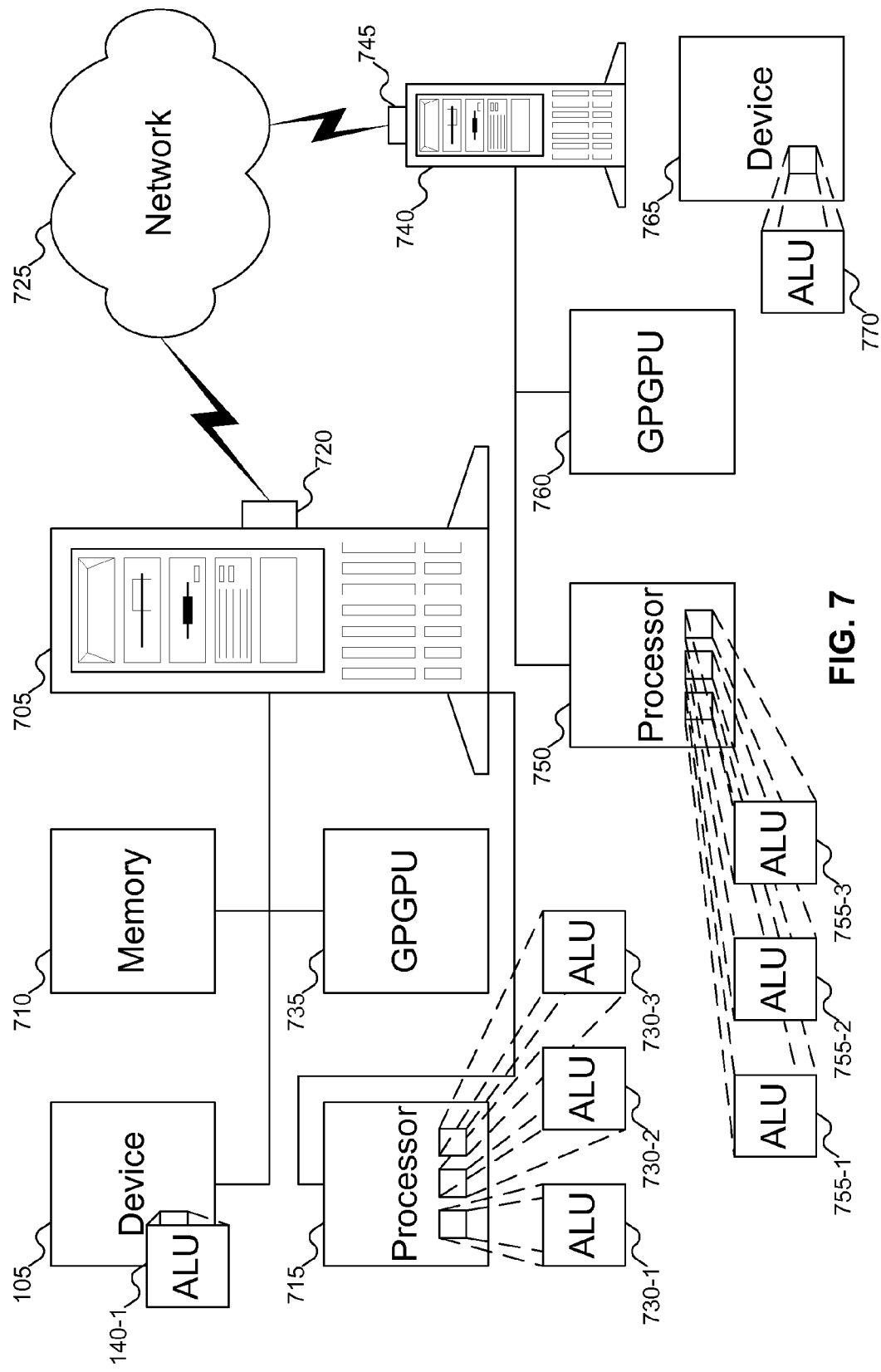
FIG. 7 shows a host computer including the device of FIG. 1, according to an embodiment of the inventive concept.

FIG. 7 shows a host computer including device 105 of FIG. 1, with its own ALUs, such as ALU 140-1, according to an embodiment of the inventive concept. In FIG. 7, host computer 705 is shown. A person skilled in the art will recognize that other components not shown can be attached to host computer 705: for example, other input/output devices, such as a monitor, keyboard, mouse, and/or printer, can be included. In addition, host computer 705 can include conventional internal components such as memory 710, one or more central processing units 715, network adapter 720, and so on. A person skilled in the art will recognize that host computer 705 can interact with other servers and/or computer systems, either directly or over a network, such as network 725, which can be any type of network: for example, Local Area Network (LAN), Wide Area Network (WAN), Virtual Private Network (VPN), or Internet. In addition, although FIG. 7 shows only one network 725, which is intended to represent a LAN or WAN, a person skilled in the art will recognize that host computer 705 can be connected to any number of networks, each network being of the same or different type. To enable communication over network 725, host computer 705 can include a transmitter/receiver (not shown in FIG. 7), which can transmit and receive data. Finally, although FIG. 7 shows host computer 705 as a conventional host computer, a person skilled in the art will recognize that host computer 705 can be any type of machine or computing device, including, for example, a desktop computer, a laptop computer, a tablet computer, a personal digital assistant (PDA), or a smart phone, among other possibilities.

Just like processor 115 of FIG. 1, processor 715 can include various ALUs, such as ALUs 730-1, 730-2, and 730-3. Although FIG. 7 shows processor 715 as including three ALUs, embodiments of the inventive concept can have processor 715 including any number of ALUs. In addition, host computer 705 can include GPGPU 735. Although FIG. 7 shows host computer 705 as including one GPGPU 735, embodiments of the inventive concept can include any number of GPGPUs within host computer 705.

FIG. 7 also shows a second computer 740 that can be connected to host computer 705 via network 725. Second computer 740 can also be called a network computer, for this reason. Like host computer 705, second computer 740 can include network adaptor 745 to interface with network 725, and one or more processors 750, which can include ALUs 755-1, 755-2, and 755-3 and/or GPGPU 760. Second computer 740 can also include its own device 765 that can have ALUs, such as ALU 770. Although FIG. 7 shows device 765 with only one ALU 770, embodiments of the inventive concept can include any number of ALUs in device 765. In addition, device 765 can store the data or the algorithm being used, as described above with reference to FIG. 1. With second computer 740 reachable via network 725, ALUs 755-1, 755-2, 755-3, and 770 can be used to execute iterations of algorithm 130 of FIG. 1 from device 105. While FIG. 7 shows only one network computer 740, embodiments of the inventive concept support any number of network computers and other devices, accessible across network 725, directly connected to host computer 705, or both.

Figure 8:
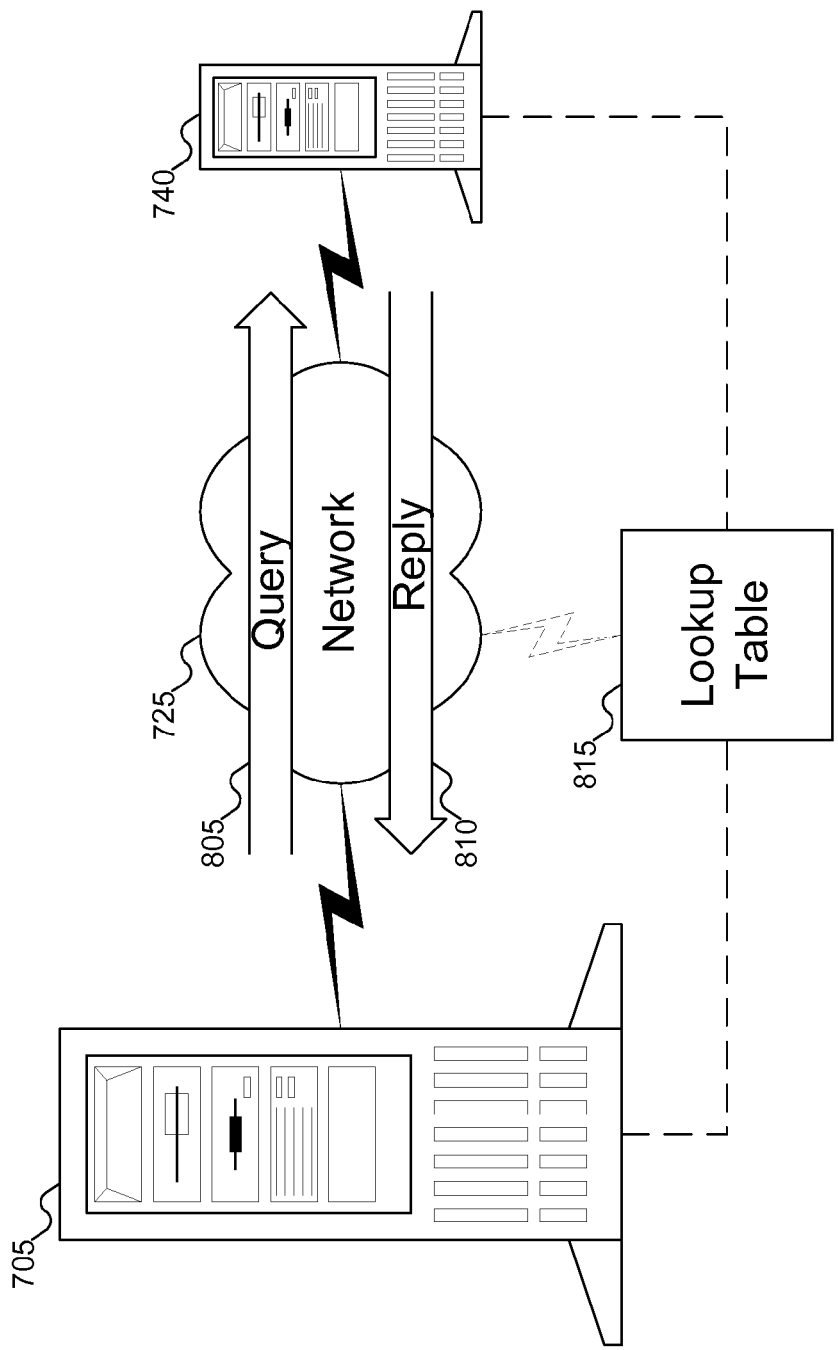
FIG. 8 shows the host computer of FIG. 7 determining available ALUs and their accuracies, according to embodiments of the inventive concept.

For adaptive mechanism 125 of FIG. 1 to be able to assign an iteration of algorithm 130 of FIG. 1 to an ALU, adaptive mechanism 125 of FIG. 1 needs to know what ALUs are available and how accurate they are. FIG. 8 shows different embodiments of the inventive concept that enable adaptive mechanism 125 of FIG. 1 to determine the available ALUs and their accuracies.

In one embodiment of the inventive concept, host computer 740 can query the various devices connected to network 725 to determine what ALUs are available and how accurate they are. For example, FIG. 8 shows host computer sending query 805 to network computer 740. Query 805 can ask network computer 740 what ALUs are installed on or in or available via network computer 740. (For example, network computer 740 can have ALUs available within its processor or GPGPU, but it might also have ALUs accessible via a device with in-storage computing, much like device 105 of FIG. 1.) Network computer 740 can then respond with reply 810, indicating what ALUs are available and how accurate they are.

In some embodiments of the inventive concept, indicating that an ALU is "available" can mean nothing more than the fact that the ALU is installed in network computer 740 or a connected device. But in other embodiments of the inventive concept, indicating that an ALU is "available" can mean more. For example, the processor in network computer 740 might be busy running processes for network computer 740, and those ALUs might not be "available" to run an iteration of algorithm 130 of FIG. 1 for a period of time.

In another embodiment of the inventive concept, host computer 705 and network computer 740 can update lookup table 815 regarding what ALUs are available and how accurate they are. As ALU availability changes, host computer 705 and network computer 740 can update lookup table 815 to reflect the changes. Then, when adaptive mechanism 125 of FIG. 1 requires an ALU to execute an iteration of algorithm 130, adaptive mechanism 125 of FIG. 1 only needs to access lookup table 815 to determine what ALUs are available and how accurate they are. This avoids the need for different algorithms to separately query individual computers to determine available ALUs.

FIG. 9 shows details of an example lookup table 815 of FIG. 8. In FIG. 9, lookup table 815 is shown as including three columns, specifying the location (i.e., machine on the network) housing the ALU, an identifier for the ALU, and the accuracy of the ALU. Thus, computer C1 (903) is shown as including four ALUs: ALU1 (906) with 32-bit accuracy (909), ALU2 (912) with 32-bit accuracy (915), ALU3 (918) with 64-bit accuracy (921), and GPGPU1 (924), with 64-bit accuracy (927). Computer C2 (930) also has four ALUs: ALU4 (933) with 32-bit accuracy (936), ALU5 (939) with 64-bit accuracy (942), ALU6 (945) with 128-bit accuracy (948), and GPGPU2 (951), with 128-bit accuracy (954). Finally, device D1 (957) has ALU7 (960), which is a configurable ALU with a maximum accuracy of 64-bits (963).

While lookup table 815 shows three columns of information, lookup table 815 can include additional columns. For example, lookup table 815 can indicate whether a particular ALU is available at the current time, or other time information.

While FIG. 9 shows lookup table 815 as listing three computers/devices and nine ALUs, embodiments of the inventive concept can include lookup table 815 listing any number of ALUs for any number of computers/devices. Similarly, the accuracies of the ALUs are not limited to 32-bit, 64-bit, and 128-bit accuracies: any accuracy supported by the ALU can be specified.

Although lookup table 815, in the embodiment of the inventive concept shown in FIG. 9, uses distinct identifiers for each ALU, other embodiments of the inventive concept can reuse ALU identifiers, provided that the combination of the ALU identifier and its location is unique. All that is needed is that an ALU can be uniquely identified, and the location of the ALU can be an element used to uniquely identify an ALU.

Figure 10:
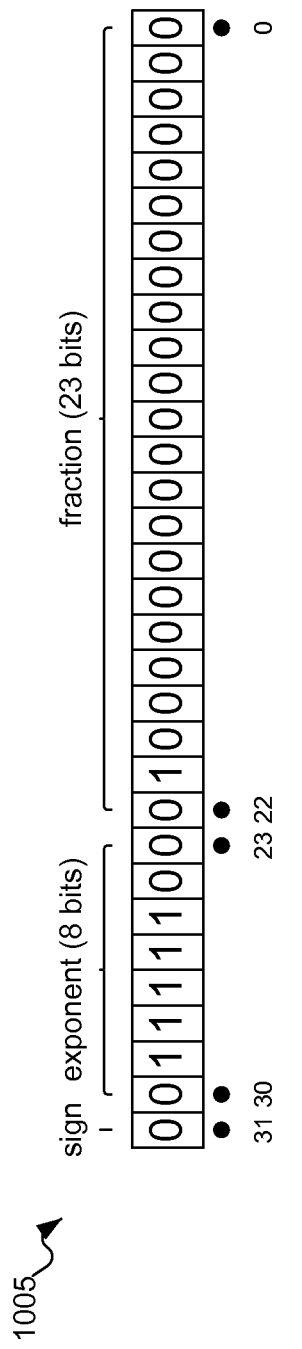
FIG. 10 shows a floating point representation of a number.

As shown in FIG. 9, ALU7 (960) is identified as a configurable ALU; embodiments of the inventive concept can use configurable ALUs. A configurable ALU is an ALU that can be programmed with a desired accuracy. For example, the IEEE Standard for Floating Point Arithmetic (IEEE 754) uses exponent bits and fraction bits to represent numbers. FIG. 10 shows a floating point representation of a number. In FIG. 10, number 1005 is shown using a floating point representation. Number 1005 can use one bit (bit 31) to store the sign of number 1005, eight bits (bits 23-31) to store the exponent part of number 1005, and 23 bits (bits 0-22) to store the fraction part of number 1005.

Inexact computing can be related to the number of bits in the fraction part and/or the exponent part. The more bits used, the greater the accuracy of number 1005. Conversely, the fewer bits used, the lower the accuracy of number 1005. For example, the fraction part of number 1005 can be reduced from 23 bits to 10 bits when the additional accuracy (13 additional bits) is not required. By using only the 10 most significant bits and discarding the 13 least significant bits of the fraction part, reduced accuracy can be achieved.

The exponent part of number 1005 can also be reconfigured in a configurable ALU. But instead of disabling the least significant bits, the most significant bits of the exponent part can be discarded.

The accuracy requirement detection can be done either in software or in hardware. In hardware, simple bit-use detection can be utilized to decide the accuracy requirement. In software, on the other hand, light delta value detection is adequate to detect the bit requirement.

Figure 11:
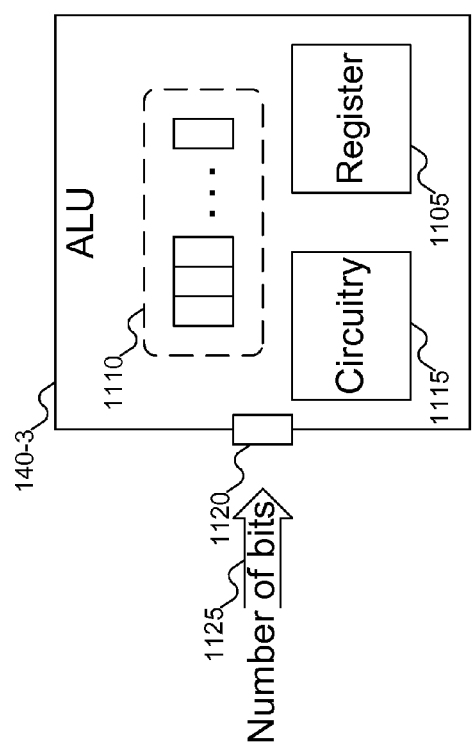
FIG. 11 shows a configurable ALU being configured for a particular accuracy, according to an embodiment of the inventive concept.

FIG. 11 shows a configurable ALU being configured for a particular accuracy, according to an embodiment of the inventive concept. In FIG. 11, ALU 140-3 is shown, which is one of the ALUs within device 105 of FIG. 1, which in turn can be a smart SSD, for example. But ALU 140-3 can be an ALU within host computer 705, network computer 740, or other devices accessible to device 105

ALU 140-3 can include register 1105, which can store data, such as number 1110. ALU 140-3 can also include instructions to perform arithmetic operations on numbers, such as number 1110, with up to a certain number of bits. These instructions can be embodied within circuitry 1115. For example, if ALU 140-3 is the ALU identified as ALU7 (960 of FIG. 9), then ALU 140-3 has a maximum accuracy of 64 bits, meaning that number 1110 is 64 bits in length. But ALU 140-3 can receive an input via port 1120. This input can specify number of bits 1125 to use within number 1110. Thus, for example, number of bits 1125 might be 32 bits, indicating that ALU 140-3 is to perform calculations that are only half as accurate as it can actually support. Reducing the accuracy of ALU 140-3, as noted above, means the resulting calculations are less accurate. But reducing the accuracy of ALU 140-3 can result in faster calculations, trading accuracy for speed. If number 1110 is a floating point number, ALU 140-3 can achieve this reduced accuracy by ignoring the least significant bits of a fractional part of number 1110, or by ignoring the most significant bits of an exponent part of number 1110, or both. If number 1110 is an integer, ALU 140-3 can achieve this reduced accuracy by ignoring the most significant bits of number 1110. Other embodiments of the inventive concept can achieve this reduced accuracy of number 1110 in other ways.

Figure 12:
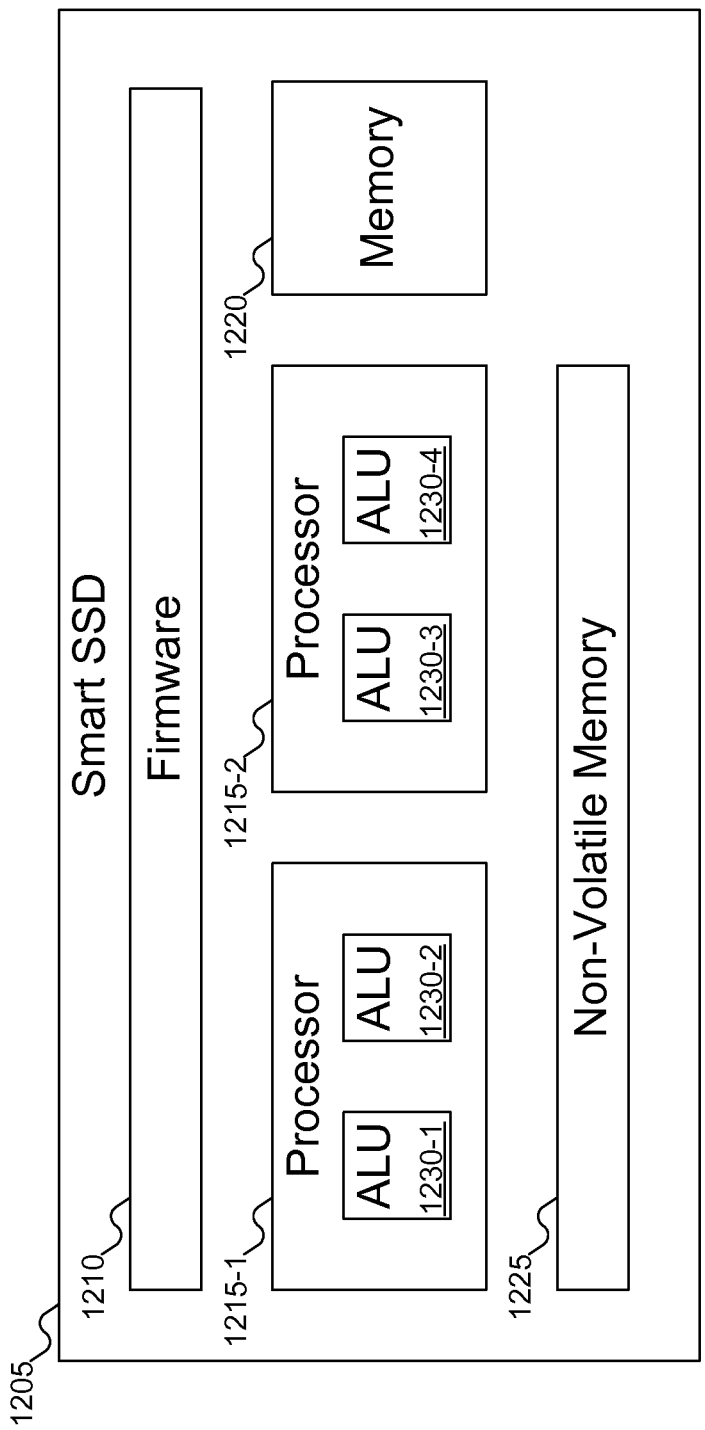
FIG. 12 shows a smart Solid State Drive (SSD) equipped with processors for in-storage computing.

FIG. 12 shows an example smart SSD equipped with processors for in-storage computing. In FIG. 12, smart SSD 1205 is shown. Smart SSD 1205 can include, among other elements, firmware 1210, processors 1215-1 and/or 1215-2, memory 1220, and non-volatile memory 1225. Firmware 1210 can include software that provides control, monitoring and data manipulation of the elements of smart SSD 1205. Processors 1215-1 and 1215-2 can provide in-store computing capabilities to smart SSD 1205. By including processors 1215-1 and 1215-2, with their respective ALUs 1230-1, 1230-2, 1230-3, and 1230-4, data does not need to be migrated from an SSD to local memory in a host computer to be processed: processors 1215-1 and/or 1215-2 can perform computations on data stored in smart SSD 1205. By saving the time and bandwidth needed to move data from smart SSD 1205 into the local memory of the host computer, computation speed is increased. Memory 1220 can be a local "scratchpad" memory used by processors 1215-1 and 1215-2 in performing their computations. And non-volatile memory 1225 can store data long-term for the associated computing device.

If adaptive mechanism 125 of FIG. 1 is aware of ALUs 1230-1, 1230-2, 1230-3, and 1230-4 of smart SSD 1205, and if smart SSD 1205 stores data 135 and algorithm 130 of FIG. 1, then adaptive mechanism 125 of FIG. 1 can schedule iterations of algorithm 130 of FIG. 1 to be performed in one or more of ALUs 1230-1, 1230-2, 1230-3, and 1230-4. As noted above, by performing computations within smart SSD 1205, calculations can be returned more quickly by avoiding the time needed to transfer data between smart SSD 1205 and the local memory of the associated computer.

Figure 13A:
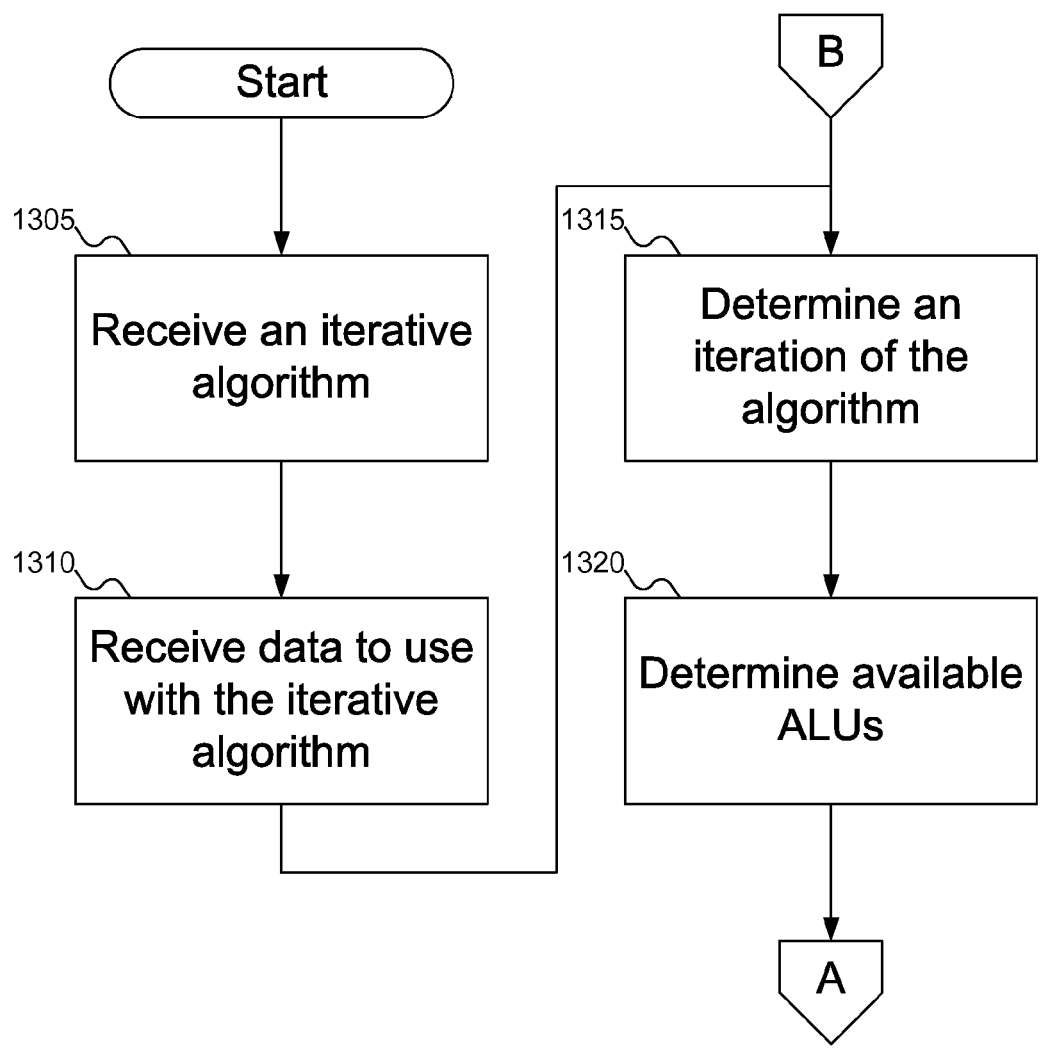
FIGS. 13A-13B show a flowchart of a procedure for using the device of FIG. 1 to improve a fast, inexact algorithm using variable accuracy, according to an embodiment of the inventive concept.
Figure 13B:
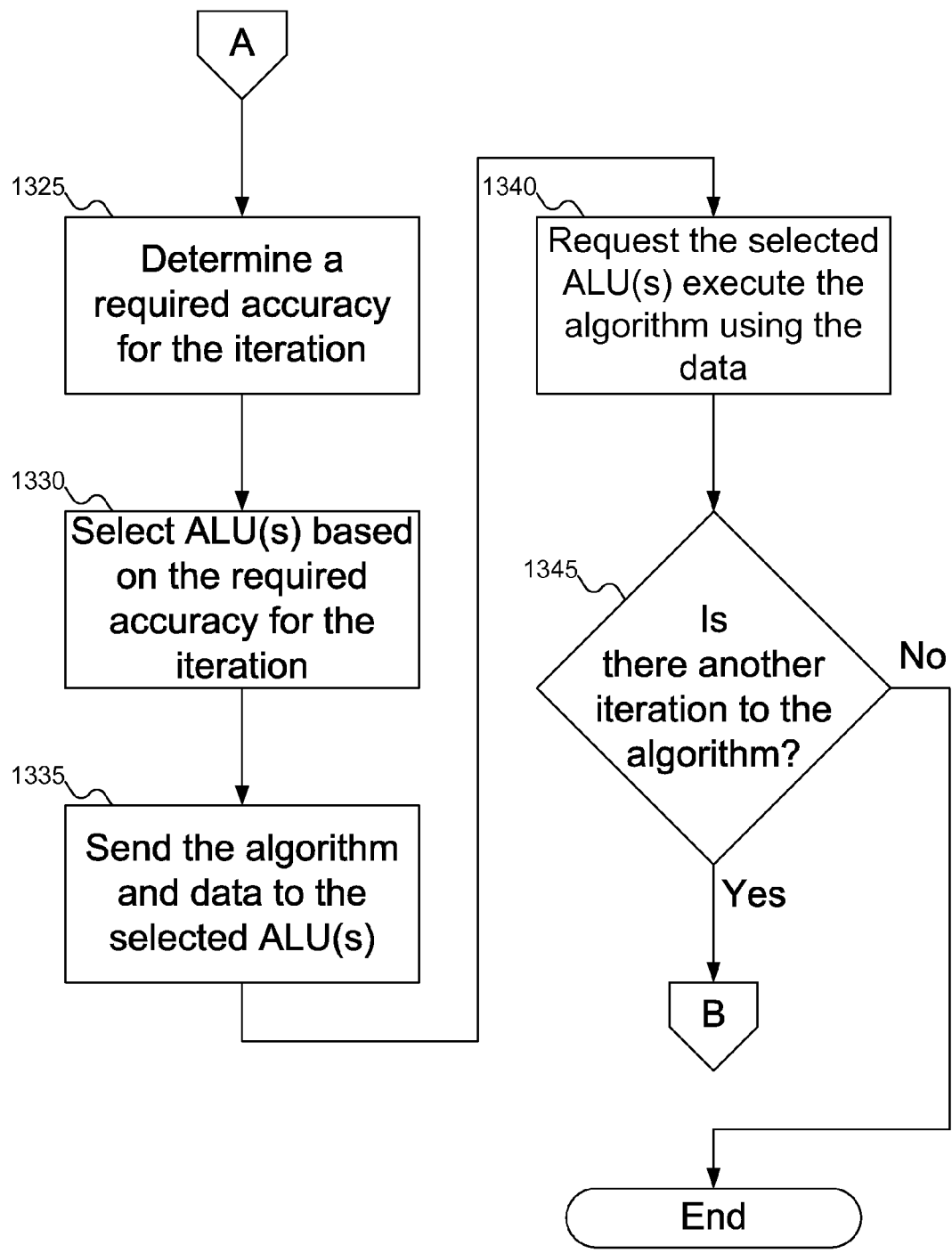

FIGS. 13A-13B show a flowchart of an example procedure for using the device of FIG. 1 to improve a fast, inexact algorithm using variable accuracy, according to an embodiment of the inventive concept. In FIG. 13A, at block 1305, device 105 of FIG. 1 can receive algorithm 130 of FIG. 1. At block 1310, device 105 of FIG. 1 can receive data 135. At block 1315, adaptive mechanism 125 of FIG. 1 can identify an iteration of algorithm 130 of FIG. 1 that is to be executed. At block 1320, adaptive mechanism 125 of FIG. 1 can determine what ALUs are available that might be able to execute the iteration of algorithm 130 of FIG. 1.

At block 1325 (FIG. 13B), accuracy requirement detector 120 of FIG. 1 can determine the required accuracy for the iteration of algorithm 130 of FIG. 1. At block 1330, adaptive mechanism 125 of FIG. 1 can select one or more ALUs to execute the iteration of algorithm 130 of FIG. 1, based on the required accuracy. At block 1335, adaptive mechanism 125 of FIG. 1 can send algorithm 130 and data 135 of FIG. 1 to the selected ALU(s). At block 1340, adaptive mechanism 125 of FIG. 1 can request the selected ALU(s) to execute algorithm 130 of FIG. 1 using data 135 of FIG. 1. At block 1345, adaptive mechanism 125 of FIG. 1 can determine whether there is another iteration of algorithm 130 of FIG. 1 to execute. If so, then processing returns to block 1315 of FIG. 13A. Otherwise, processing ends.

A few comments about the flowchart shown in FIGS. 13A-13B are in order. First, although FIGS. 13A-13B describe device 105 of FIG. 1 as receiving algorithm 130 and data 135 of FIG. 1, any appropriate element of the system can receive algorithm 130 and data 135 of FIG. 1. For example, host computer 705 of FIG. 7 can receive these elements. Second, although FIGS. 13A-13B describe accuracy requirement detector 120 of FIG. 1 as determining the required accuracy for the iteration of algorithm 130 of FIG. 1, the accuracy requirement can come from algorithm 130 of FIG. 1 instead. Third, although FIG. 13A-13B describe algorithm 130 and data 135 of FIG. 1 being sent to the selected ALU(s), it might happen that algorithm 130 and/or data 135 of FIG. 1 do not need to be sent to the selected ALUs. For example, if the selected ALU is an ALU within device 105 which stores data 135 of FIG. 1, then the ALU already has access to data 135. Or, if the selected ALU was used to execute an earlier iteration of algorithm 130 and still stores algorithm 130 and/or data 135 of FIG. 1, then the selected ALU does not algorithm 130 and/or data 135 of FIG. 1 to be sent to it. Fourth, the reason FIGS. 13A-13B describe potentially selecting and using multiple ALUs is to support parallel path search, as described above with reference to FIG. 6.

In FIGS. 13A-13B (and in the other flowcharts below), one embodiment of the inventive concept is shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Figure 14A:
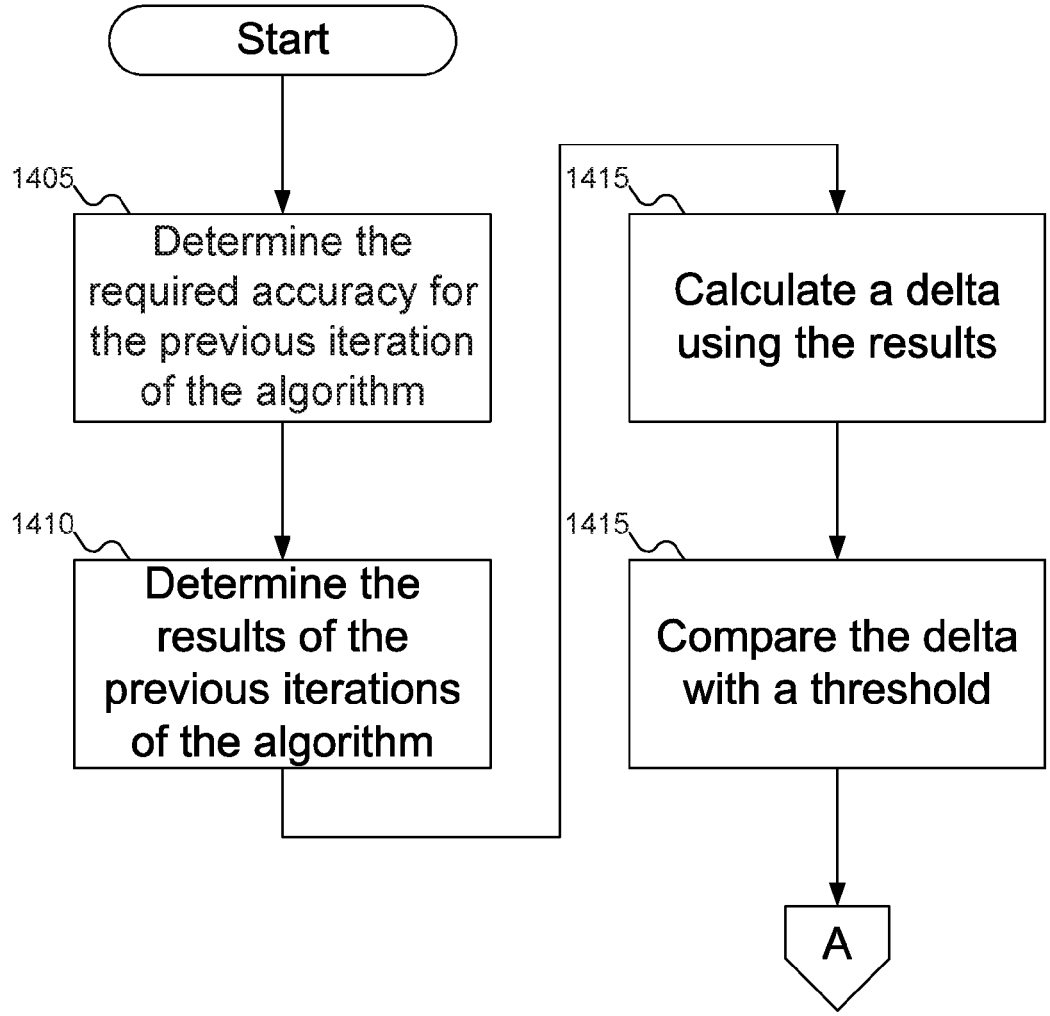
FIGS. 14A-14B show a flowchart of a procedure for determining an accuracy for an iteration of the fast, inexact algorithm, according to an embodiment of the inventive concept.
Figure 14B:
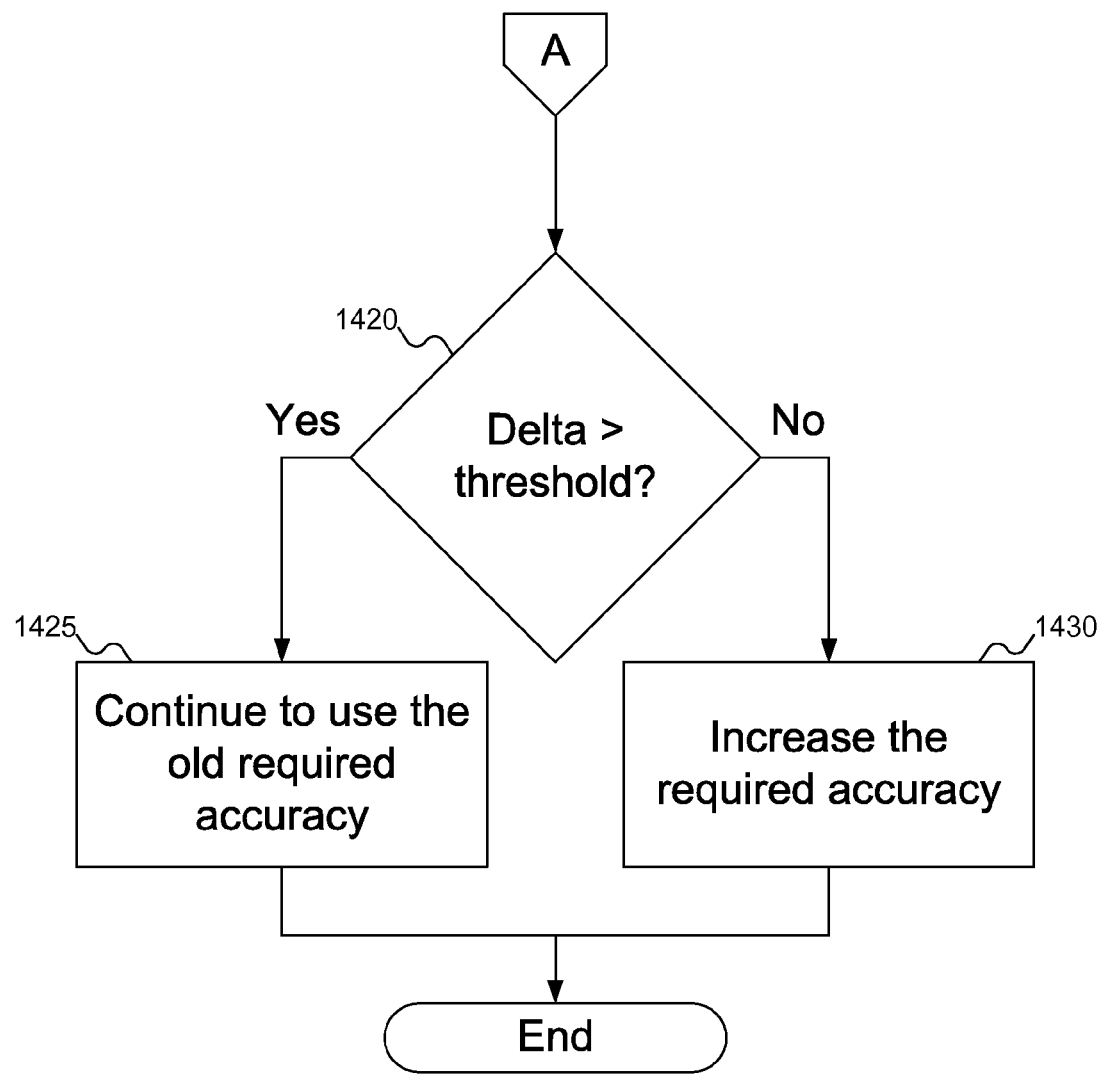

FIGS. 14A-14B show a flowchart of an example procedure for determining an accuracy for an iteration of the fast, inexact algorithm, according to an embodiment of the inventive concept. In FIG. 14A, at block 1405, accuracy requirement determiner 120 of FIG. 1 can determine the accuracy for the previous iteration of algorithm 130 of FIG. 1. At block 1410, accuracy requirement determiner 120 of FIG. 1 can determine the results of previous iterations of algorithm 130 of FIG. 1. Accuracy requirement determiner 120 of FIG. 1 can determine any number of results of previous iterations. For example, accuracy requirement determiner 120 of FIG. 1 can determine the results of two previous iterations, or any number of previous iterations. Regardless of the number of results determined, at block 1415 accuracy requirement determiner 120 of FIG. 1 can determine delta 210 of FIG. 2 using the results. If two results are used, delta 210 of FIG. 2 can be simply the difference between the two results. If more than two results are used, a more complicated calculation can be used. For example, differences between pairs of results in consecutive iterations can be computed, and those differences can then be averaged. Or the differences can be weighted to favor results from more recent iterations, or from older iterations. Any desired formula to calculate delta 210 of FIG. 2 can be used. Regardless of the formula used to calculate delta 210 of FIG. 2, at block 1415, accuracy requirement determiner 120 of FIG. 1 can compare delta 210 of FIG. 2 with threshold 215 of FIG. 2.

At block 1420 (FIG. 14B), the result of the comparison between delta 210 of FIG. 2 and threshold 215 of FIG. 2 can be determined. If delta 210 of FIG. 2 is greater than threshold 215 of FIG. 2, then at block 1425 accuracy requirement determiner 120 of FIG. 1 can continue to use the existing accuracy requirement. But if delta 210 of FIG. 2 is less than threshold 215 of FIG. 2, then at block 1430, accuracy requirement determiner 120 of FIG. 1 can set an increased accuracy requirement. With this increased accuracy requirement can come a new threshold for when the accuracy requirement might need to be increased again.

Figure 15:
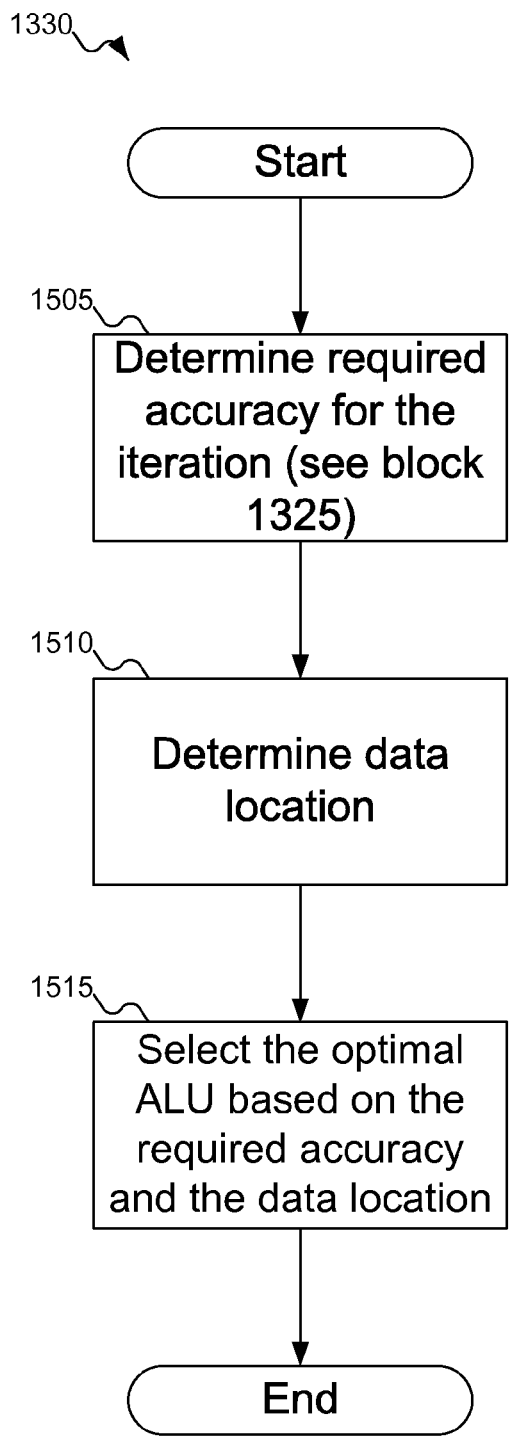
FIG. 15 shows a flowchart of a procedure for selecting an ALU appropriate for the required accuracy of an iteration of the fast, inexact algorithm, according to an embodiment of the inventive concept.

FIG. 15 shows a flowchart of an example procedure for selecting an ALU appropriate for the required accuracy of an iteration of the fast, inexact algorithm, according to an embodiment of the inventive concept. In FIG. 15, at block 1505, adaptive mechanism 125 of FIG. 1 can determine required accuracy 205 of FIG. 2 for the iteration of algorithm 130 of FIG. 1. This block can be simply a copy of block 1325 of FIG. 13B, and not involve a separate implementation of execution from block 1325 of FIG. 13B. At block 1510, adaptive mechanism 125 of FIG. 1 can determine where the data is stored. As described above with reference to FIGS. 1 and 7, algorithm 130 and data 135 can be stored on separate devices, which can affect the choice of ALU to execute an iteration of algorithm 130 of FIG. 1. At block 1515, adaptive mechanism 125 of FIG. 1 can select an ALU to execute the iteration of algorithm 130 of FIG. 1. The selection of ALU can factor in, among other considerations, which ALU(s) have sufficient accuracy without using an ALU with excessive accuracy. For example, if required accuracy 205 of FIG. 2 would be satisfied by an ALU with 32-bit accuracy, adaptive mechanism 125 of FIG. 1 can select an ALU with 32-bit accuracy rather than, say, an ALU with 64-bit accuracy. Of course, if no 32-bit ALUs are available, then adaptive mechanism 125 of FIG. 1 might select an ALU with 64-bit accuracy anyway, as the latency associated with a higher-accuracy ALU might be less than the delay to wait for a 32-bit ALU to become available.

Another factor adaptive mechanism 125 of FIG. 1 can consider in selecting an ALU can be the location of the data. For example, if there are multiple ALUs with required accuracy 205 available, adaptive mechanism 125 of FIG. 1 can select an ALU that is closest to the location of data 135 of FIG. 1. Selecting an ALU close to the location of data 135 of FIG. 1 can reduce the time needed to transfer the data from device 105 of FIG. 1 to memory near the selected ALU.

While the above description suggests that adaptive mechanism 135 of FIG. 1 favors an ALU with minimally sufficient accuracy over other considerations, other embodiments of the inventive concept can favor other considerations. For example, adaptive mechanism 135 of FIG. 1 can favor an SPU on the device storing data 130 of FIG. 1 over other ALUs, even if the SPU has a greater accuracy than is required. Or adaptive mechanism 135 of FIG. 1 can consider the bandwidth between data 135 of FIG. 1 and the available ALUs, and select an ALU to which data 135 of FIG. 1 can be transferred most quickly, again even if the selected ALU has a higher accuracy than is required. Embodiments of the inventive concept can consider all such variations in how to select an ALU, including how to "break ties" between ALUs that are otherwise equally viable.

Figure 16A:
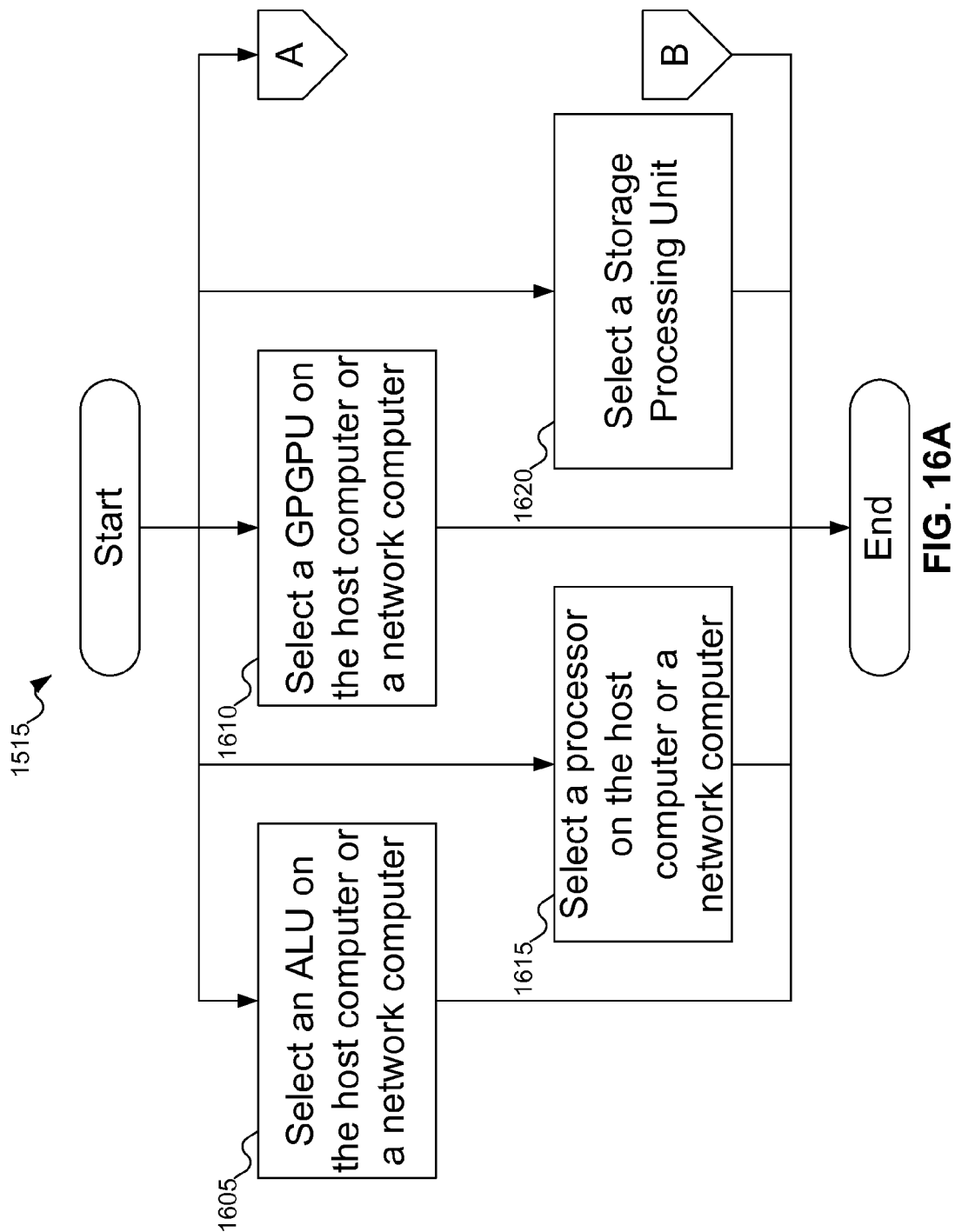
FIGS. 16A-16B show a flowchart of a procedure for selecting different ALUs for an iteration of the fast, inexact algorithm, according to an embodiment of the inventive concept.
Figure 16B:
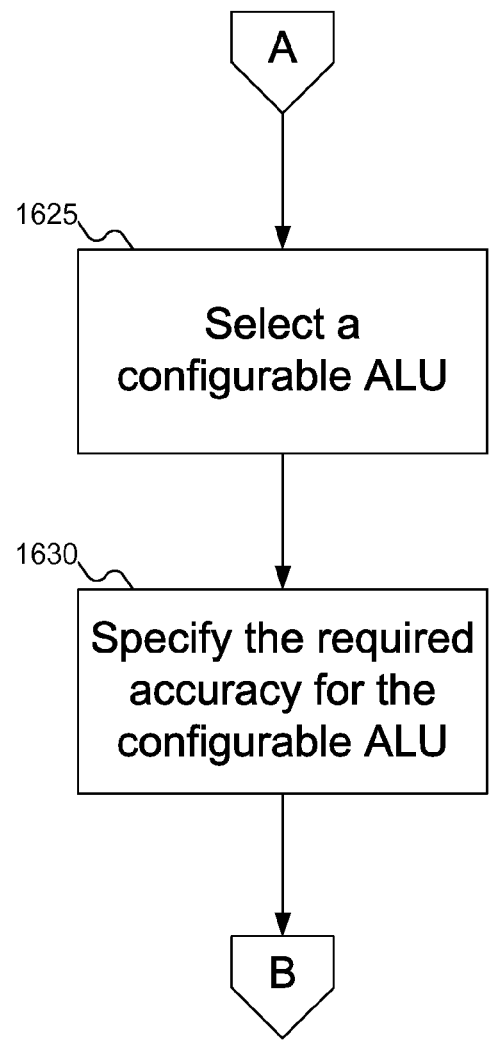

FIGS. 16A-16B show a flowchart of an example procedure for selecting different ALUs for an iteration of the fast, inexact algorithm, according to an embodiment of the inventive concept. In FIG. 16A, at block 1605, adaptive mechanism 125 of FIG. 1 can select an ALU on host computer 705 or network computer 750 of FIG. 7 to execute an iteration of algorithm 130 of FIG. 1. Alternatively, at block 1610, adaptive mechanism 125 of FIG. 1 can select a GPGPU on host computer 705 or network computer 750 of FIG. 7 to execute an iteration of algorithm 130 of FIG. 1. Alternatively, at block 1615, adaptive mechanism 125 of FIG. 1 can select a processor on host computer 705 or network computer 750 of FIG. 7 to execute an iteration of algorithm 130 of FIG. 1. Alternatively, at block 1620, adaptive mechanism 125 of FIG. 1 can select a storage processing unit (SPU) (in-storage computing: that is, an ALU within a storage device such as a Smart SSD) to execute an iteration of algorithm 130 of FIG. 1.

Alternatively, at block 1625 (FIG. 16B), adaptive mechanism 125 of FIG. 1 can select configurable ALU 140-3 of FIG. 11 (wherever located: on a Smart SSD, on host computer 705 of FIG. 7, on network computer 740 of FIG. 7, or elsewhere) to execute an iteration of algorithm 130 of FIG. 1. Then, at block 1630, adaptive mechanism 125 of FIG. 1 can then configure the accuracy of configurable ALU 140-3 of FIG. 11 by specifying the required accuracy (that is, the number of bits to use in computations).

Figure 17:
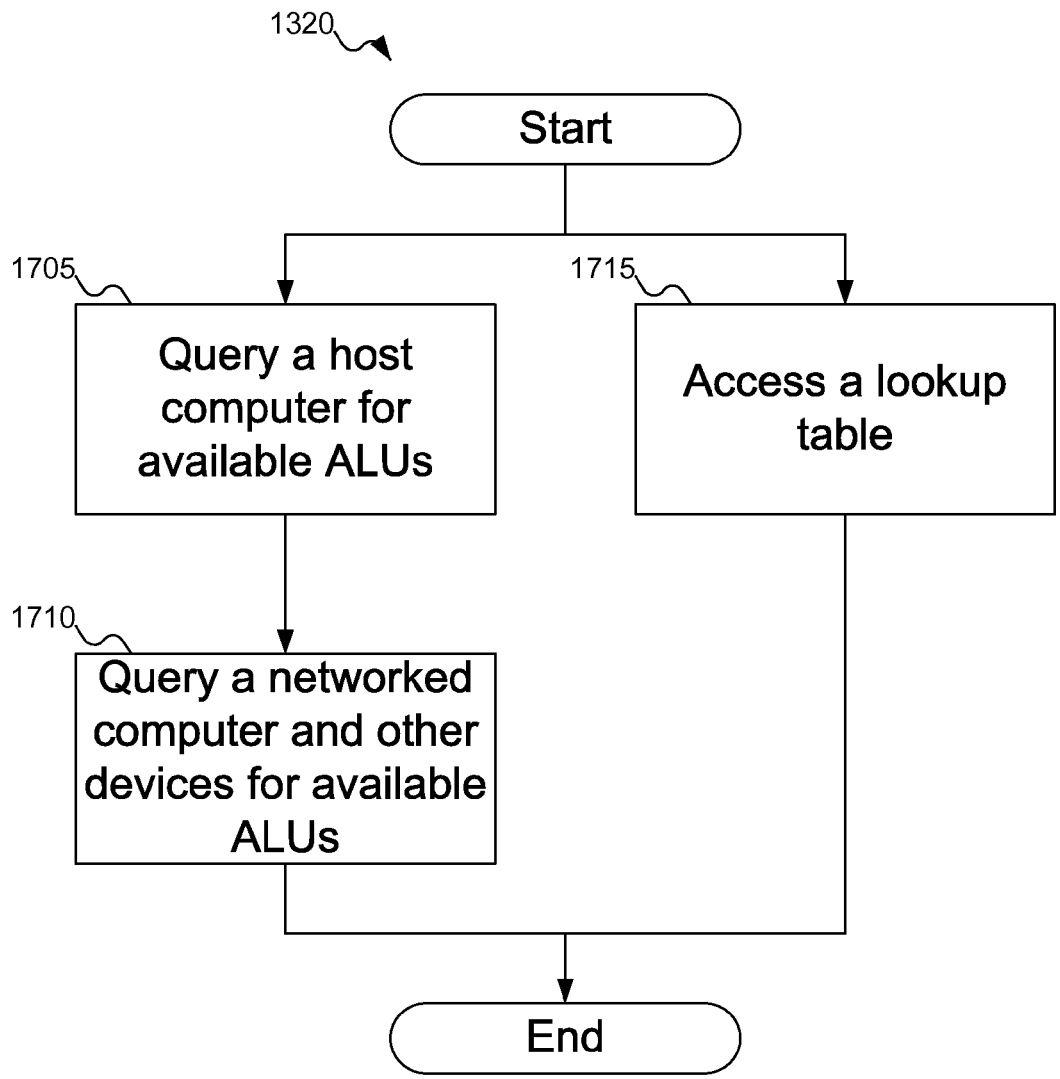
FIG. 17 shows a flowchart of a procedure for the host computer of FIG. 7 to determine the available ALUs and their accuracy, according to an embodiment of the inventive concept.

FIG. 17 shows a flowchart of a procedure for the host computer of FIG. 7 to determine the available ALUs and their accuracy, according to an embodiment of the inventive concept. In FIG. 17, at block 1705, adaptive mechanism 125 of FIG. 1 can query host computer 705 for what ALUs it has available. Adaptive mechanism 125 of FIG. 1 can also query host computer 705 of FIG. 7 for the accuracies of the available ALUs. At block 1710, adaptive mechanism 125 of FIG. 1 can query network computer 740 of FIG. 7 and other accessible devices (such as Smart SSDs and other devices that include ALUs) for what ALUs they have available. Adaptive mechanism 125 of FIG. 1 can also query network computer 740 of FIG. 7 and the other devices for the accuracies of the available ALUs.

Alternatively, at block 1715, adaptive mechanism 125 of FIG. 1 can access lookup table 815 of FIGS. 8-9 to determine what ALUs are available and their accuracies.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept can extend to the following statements, without limitation:

Statement 1. An embodiment of the inventive concept includes a device, comprising:

a storage to store data;

an accuracy requirement detector to determine a required accuracy for an iteration of an algorithm; and an adaptive mechanism coupled to the accuracy requirement detector within the device, the adaptive mechanism operative to schedule the iteration of the algorithm using the data across a plurality of available arithmetic logic units (ALUs) based on a required accuracy for the iteration of the algorithm.

Statement 2. An embodiment of the inventive concept includes a device according to statement 1, wherein the available ALUs include at least one of a processor in the device, an ALU on a host computer, an ALU on a network computer, a general-purpose computing on graphics processing unit (GPGPU) on the host computer, and a GPGPU on the network computer.

Statement 3. An embodiment of the inventive concept includes a device according to statement 2, wherein the available ALUs further include a configurable ALU.

Statement 4. An embodiment of the inventive concept includes a device according to statement 3, wherein the processor includes the configurable ALU.

Statement 5. An embodiment of the inventive concept includes a device according to statement 6, wherein the configurable ALU is operative to receive a number of bits to use in executing the iteration of the algorithm.

Statement 6. An embodiment of the inventive concept includes a device according to statement 2, wherein the available ALUs include at least a first ALU with a first accuracy and a second ALU with a second accuracy.

Statement 7. An embodiment of the inventive concept includes a device according to statement 2, wherein the adaptive mechanism is operative to determine the plurality of available ALUs by querying a lookup table.

Statement 8. An embodiment of the inventive concept includes a device according to statement 2, wherein the adaptive mechanism is operative to determine the plurality of available ALUs by querying computers devices connected to device.

Statement 9. An embodiment of the inventive concept includes a device according to statement 1, wherein the adaptive mechanism is operative to select one of the plurality of the available ALUs that is at least as accurate as the required accuracy for the iteration of the algorithm.

Statement 10. An embodiment of the inventive concept includes a device according to statement 1, wherein the accuracy requirement detector is operative to calculate the required accuracy for the iteration of the algorithm by calculating a delta between results in previous iterations of the algorithm and comparing the delta against a threshold.

Statement 11. An embodiment of the inventive concept includes a device according to statement 1, wherein the adaptive mechanism is operative to receive the required accuracy for the iteration of the algorithm from the algorithm.

Statement 12. An embodiment of the inventive concept includes a device according to statement 1, wherein:

the iteration of the algorithm includes alternative calculations; and the adaptive mechanism is operative to select a second plurality of ALUs from the plurality of available ALUs, each of the selected second plurality of ALUs operative to execute one alternative calculation from the iteration of the algorithm.

Statement 13. An embodiment of the inventive concept includes a computer system, comprising:
a host computer;
a first processor in the host computer;
a network adapter on the host computer, the network adapter capable of connecting to a second computer over a network; and
a device connected to the host computer, the device including:
a storage to store data;
an accuracy requirement detector to determine a required accuracy for an iteration of an algorithm; and
an adaptive mechanism coupled to the accuracy requirement detector within the device, the adaptive mechanism operative to schedule the iteration of the algorithm using the data across a plurality of available ALUs based on a required accuracy for the iteration of the algorithm.

Statement 14. An embodiment of the inventive concept includes a computer system according to statement 13, wherein the available ALUs include at least one of an ALU in the first processor, an ALU in a second processor in the device, an ALU on the second computer, a General-Purpose computing on Graphics Processing Unit (GPGPU) on the host computer, and a GPGPU on the second computer.

Statement 15. An embodiment of the inventive concept includes a computer system according to statement 14, wherein the available ALUs further include a configurable ALU.

Statement 16. An embodiment of the inventive concept includes a computer system according to statement 15, wherein the second processor includes the configurable ALU.

Statement 17. An embodiment of the inventive concept includes a computer system according to statement 18, wherein the configurable ALU is operative to receive a number of bits to use in executing the iteration of the algorithm.

Statement 18. An embodiment of the inventive concept includes a computer system according to statement 14, wherein the available ALUs include at least a first ALU with a first accuracy and a second ALU with a second accuracy.

Statement 19. An embodiment of the inventive concept includes a computer system according to statement 14, wherein the adaptive mechanism is operative to determine the plurality of available ALUs by querying a lookup table.

Statement 20. An embodiment of the inventive concept includes a computer system according to statement 14, wherein the adaptive mechanism is operative to determine the plurality of available ALUs by querying at least the host computer and the second computer.

Statement 21. An embodiment of the inventive concept includes a computer system according to statement 13, wherein the adaptive mechanism is operative to select one of the plurality of the available ALUs that is at least as accurate as the required accuracy for the iteration of the algorithm.

Statement 22. An embodiment of the inventive concept includes a computer system according to statement 13, wherein the accuracy requirement detector is operative to calculate the required accuracy for the iteration of the algorithm by calculating a delta between results in previous iterations of the algorithm and comparing the delta against a threshold.

Statement 23. An embodiment of the inventive concept includes a computer system according to statement 13, wherein the adaptive mechanism is operative to receive the required accuracy for the iteration of the algorithm from the algorithm.

Statement 24. An embodiment of the inventive concept includes a computer system according to statement 13, wherein:
the iteration of the algorithm includes alternative calculations; and
the adaptive mechanism is operative to select a second plurality of ALUs from the plurality of available ALUs, each of the selected second plurality of ALUs operative to execute one alternative calculation from the iteration of the algorithm.

Statement 25. An embodiment of the inventive concept includes a method, comprising:
receiving an algorithm and data to process using the algorithm;
determining available arithmetic logic units (ALUs);
determining a required accuracy for an iteration of the algorithm;
selecting one or more of the available ALUs based on the required accuracy for the iteration of the algorithm;
sending the algorithm and the data to the selected one of the available ALUs; and
requesting the selected one or more of the available ALUs to execute the algorithm using the data,
wherein a system including the available ALUs is self-configuring to optimize execution of the algorithm using the data.

Statement 26. An embodiment of the inventive concept includes a method according to statement 25, wherein selecting one or more of the available ALUs based on the required accuracy for the iteration of the algorithm includes selecting one or more of the available ALUs that is at least as accurate as the required accuracy for the iteration of the algorithm.

Statement 27. An embodiment of the inventive concept includes a method according to statement 26, wherein selecting one or more of the available ALUs based on the required accuracy for the iteration of the algorithm further includes:
determining a first result of a first previous iteration of the algorithm and a second result of a second previous iteration of the algorithm;
calculating a delta between the first result and the second result; and
selecting the required accuracy by comparing the delta with a first threshold.

Statement 28. An embodiment of the inventive concept includes a method according to statement 25, wherein selecting one or more of the available ALUs includes selecting a Storage Processing Unit (SPU) on a smart Solid State Drive (SSD) based on the required accuracy for the iteration of the algorithm, wherein the SPU is capable of executing the algorithm using the data.

Statement 29. An embodiment of the inventive concept includes a method according to statement 28, wherein selecting an SPU includes selecting the SPU on the smart SSD based on the required accuracy for the iteration of the algorithm, the SSD storing the data to process using the algorithm.

Statement 30. An embodiment of the inventive concept includes a method according to statement 25, wherein selecting one or more of the available ALUs includes:
  selecting a configurable ALU; and
  specifying to the configurable ALU the required accuracy.

Statement 31. An embodiment of the inventive concept includes a method according to statement 30, wherein specifying to the configurable ALU the required accuracy includes specifying a number of bits of accuracy to use in calculations when executing the iteration of the algorithm.

Statement 32. An embodiment of the inventive concept includes a method according to statement 25, wherein selecting one or more of the available ALUs includes selecting an ALU from a host computer.

Statement 33. An embodiment of the inventive concept includes a method according to statement 25, wherein selecting one or more of the available ALUs includes selecting an ALU from a network computer.

Statement 34. An embodiment of the inventive concept includes a method according to statement 25, wherein determining available ALUs includes:
  querying a host computer for available ALUs; and
  querying at least one network computer for available ALUs.

Statement 35. An embodiment of the inventive concept includes a method according to statement 25, wherein determining available ALUs includes accessing a lookup table, the lookup table including a list of available ALUs and their locations.

Statement 36. An embodiment of the inventive concept includes a method according to statement 25, wherein determining a required accuracy for an iteration of the algorithm includes receiving, from the algorithm, the required accuracy.

Statement 37. An embodiment of the inventive concept includes a method according to statement 25, wherein:
  receiving an algorithm and data to process using the algorithm includes receiving an algorithm that includes alternative calculations for the iteration of the algorithm and the data to process using the algorithm;
  selecting one or more of the available ALUs includes selecting a plurality of the available ALUs based on the required accuracy for the iteration of the algorithm; and
  sending the algorithm and the data to the selected one or more of the available ALUs includes sending the algorithm and the data to the selected plurality of the available ALUs, each of the selected plurality of the available ALUs instructed to perform one of the alternative calculations for the iteration of the algorithm.

Statement 38. An embodiment of the inventive concept includes a configurable Arithmetic Logic Unit, comprising:
  a register to store data to be processed;
  circuitry to perform operations on the data stored in the register; and
  a port to receive a required accuracy for the operations,
  wherein the configurable ALU can perform calculations of varying accuracy.

Statement 39. An embodiment of the inventive concept includes a configurable ALU according to statement 38, wherein the port is operative to receive a number of bits as the required accuracy.

Statement 40. An embodiment of the inventive concept includes a configurable ALU according to statement 39, wherein the circuitry only uses the number of bits of register in performing the operations on the data stored in the register.

Statement 41. An embodiment of the inventive concept includes a configurable ALU according to statement 40, wherein the circuitry discards least significant bits of a fractional part of a number in performing the operations.

Statement 42. An embodiment of the inventive concept includes a configurable ALU according to statement 40, wherein the circuitry discards most significant bits of an exponent part of a number in performing the operations.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A device, comprising:
  a storage to store a data;
  an accuracy requirement detector, including a comparator to compare a delta with a threshold and a second storage for the threshold, to determine a required accuracy for an iteration of an algorithm, wherein the delta is a difference between results in previous iterations of the algorithm; and
  an adaptive mechanism coupled to the accuracy requirement detector within the device, the adaptive mechanism operative to schedule the iteration of the algorithm using the data across a plurality of available arithmetic logic units (ALUs) based on the required accuracy for the iteration of the algorithm.

2. A device according to claim 1, wherein the available ALUs include at least one of a processor in the device, an ALU on a host computer, an ALU on a network computer, a general-purpose computing on graphics processing unit (GPGPU) on the host computer, and a GPGPU on the network computer.

3. A device according to claim 2, wherein the available ALUs further include a configurable ALU.

4. A device according to claim 3, wherein the configurable ALU is operative to receive a number of bits to use in executing the iteration of the algorithm.

5. A device according to claim 3, wherein the processor includes the configurable ALU.

6. A device according to claim 2, wherein the available ALUs include at least a first ALU with a first accuracy and a second ALU with a second accuracy.

7. A device according to claim 2, wherein the adaptive mechanism is operative to determine the plurality of available ALUs by querying a lookup table.

8. A device according to claim 1, wherein the accuracy requirement detector is operative to calculate the delta as the difference between results in the previous iterations of the algorithm.

9. A device according to claim 1, wherein:
  the iteration of the algorithm includes alternative calculations; and
  the adaptive mechanism is operative to select a second plurality of ALUs from the plurality of available ALUs, each of the selected second plurality of ALUs operative to execute one alternative calculation from the iteration of the algorithm.

10. A method, comprising:
  receiving an algorithm and data to process using the algorithm;
  determining available arithmetic logic units (ALUs);

determining a required accuracy for an iteration of the algorithm, including:
 determining a first result of a first previous iteration of the algorithm and a second result of a second previous iteration of the algorithm;
 calculating a delta between the first result and the second result; and
 selecting the required accuracy responsive to comparing the delta with a first threshold;
selecting one or more of the available ALUs based on the required accuracy for the iteration of the algorithm;
sending the algorithm and the data to the selected one or more of the available ALUs; and
requesting the selected one or more of the available ALUs to execute the algorithm using the data,
wherein a system including the available ALUs is self-configuring to optimize execution of the algorithm using the data.

11. A method according to claim 10, wherein selecting one or more of the available ALUs includes selecting a Storage Processing Unit (SPU) on a smart Solid State Drive (SSD) based on the required accuracy for the iteration of the algorithm, wherein the SPU is capable of executing the algorithm using the data.

12. A method according to claim 11, wherein selecting an SPU includes selecting the SPU on the smart SSD based on the required accuracy for the iteration of the algorithm, the SSD storing the data to process using the algorithm.

13. A method according to claim 10, wherein selecting one or more of the available ALUs based on the required accuracy for the iteration of the algorithm includes selecting one or more of the available ALUs that is at least as accurate as the required accuracy for the iteration of the algorithm.

14. A method according to claim 10, wherein selecting one or more of the available ALUs includes:
 selecting a configurable ALU; and
 specifying to the configurable ALU the required accuracy.

15. A method according to claim 14, wherein specifying to the configurable ALU the required accuracy includes specifying a number of bits of accuracy to use in calculations when executing the iteration of the algorithm.

16. A method according to claim 10, wherein determining available ALUs includes accessing a lookup table, the lookup table including a list of available ALUs and their locations.

17. A method according to claim 10, wherein:
 receiving an algorithm and data to process using the algorithm includes receiving an algorithm that includes alternative calculations for the iteration of the algorithm and the data to process using the algorithm;
 selecting one of the available ALUs includes selecting a plurality of the available ALUs based on the required accuracy for the iteration of the algorithm; and
 sending the algorithm and the data to the selected one of the available ALUs includes sending the algorithm and the data to the selected plurality of the available ALUs, each of the selected plurality of the available ALUs instructed to perform one of the alternative calculations for the iteration of the algorithm.

* * * * *